(12) United States Patent
Chen et al.

(10) Patent No.: US 7,443,584 B2
(45) Date of Patent: Oct. 28, 2008

(54) POLARIZER AND EQUIPMENT FOR MANUFACTURING THE SAME

(75) Inventors: Ga-Lane Chen, Fremont, CA (US); Charles Leu, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 264 days.

(21) Appl. No.: 11/274,692

(22) Filed: Nov. 14, 2005

(65) Prior Publication Data
US 2006/0103783 A1 May 18, 2006

(30) Foreign Application Priority Data
Nov. 12, 2004 (TW) ............................... 93134597 A

(51) Int. Cl.
*G02B 5/30* (2006.01)
*G02B 1/10* (2006.01)

(52) U.S. Cl. ..................... 359/490; 359/588; 359/601

(58) Field of Classification Search ................ 359/490, 359/491, 492, 586, 588, 601, 493; 349/96
See application file for complete search history.

(56) References Cited

U.S. PATENT DOCUMENTS 5,327,180 A * 7/1994 Hester et al. ................. 351/165
6,147,732 A * 11/2000 Aoyama et al. ............. 349/112
6,502,943 B2 * 1/2003 Nakamura et al. .......... 359/603
6,542,300 B2 * 4/2003 Umemoto .................... 359/491
6,726,995 B2 4/2004 Ishii et al.
6,950,236 B2 * 9/2005 Hokazono et al. ........... 359/586

FOREIGN PATENT DOCUMENTS

| CN | 1384396 A | 12/2002 |
|---|---|---|
| CN | 1484048 A | 3/2004 |
| CN | 1532563 A | 9/2004 |

\* cited by examiner

*Primary Examiner*—Ricky D Shafer
(74) *Attorney, Agent, or Firm*—Morris Manning Martin LLP; Tim Tingkang Xia, Esq.

(57) ABSTRACT

A polarizer (2) for a liquid crystal display device includes a polarizer base (21), a first protective layer (20) and a second protective layer (22) on two sides of the polarizer base for protecting the polarizer base, and an anti-reflection layer (25) on the first protective layer. The anti-reflection layer includes a first layer (26), a second layer (27), a third layer (28) and a fourth layer (29) stacked in order. The anti-reflection layer of the polarizer can reduce the reflection of the light irradiated on the polarizer, and the loss of light can be reduced and higher light transmission rate can be achieved.

10 Claims, 2 Drawing Sheets

POLARIZER AND EQUIPMENT FOR MANUFACTURING THE SAME

BACKGROUND

1. Field of the Invention

The present invention relates to an optical polarizer and to equipment for manufacturing optical polarizers.

2. General Background

Liquid crystal display (LCD) devices are in widespread use in personal computers, desktop calculators, electronic clocks, word processors, automobiles, and other machines. Nearly all LCD devices include one or more polarizers, which function as filters with regard to the polarization of light.

A typical polarizer is shown in FIG. 3. The polarizer 1 includes a first protective layer 10, a polarizer base 11, a second protective layer 12, an adhesive layer 13, and a released layer release layer 14, arranged in that order from top to bottom.

When light beams irradiate the first protective layer 10 of the polarizer 1, some of the light beams are reflected, which results in a loss of light and a low rate of light utilization, whereby the brightness of an LCD device using the polarizer is reduced.

What is needed, therefore, is a polarizer with high rate of light utilization. What is also needed is equipment for manufacturing such a polarizer.

SUMMARY

In one preferred embodiment, a polarizer for a liquid crystal display device includes a polarizer base, a first protective layer and a second protective layer on two sides of the polarizer base for protecting the polarizer base, and an anti-reflection layer on the first protective layer.

It is of advantage that the anti-reflection layer of polarizer can reduce the reflection of the light irradiated on the polarizer. Thus, the loss of light can be reduced and higher light transmission rate can be achieved.

In another preferred embodiment, a suite of equipment for manufacturing a polarizer includes a plurality of roller devices arranged on two sides of a path for passage of a polarizer preform, an ultraviolet irradiation device arranged next in processing sequence to the roller devices, and a plurality of vapor deposition devices arranged next in processing sequence to the ultraviolet irradiation device.

It is of advantage that the anti-reflection layer of polarizer can reduce the reflection rate of the light irradiated on the polarizer. Thus, the light loss can be reduced and higher light transmission rate can be achieved.

Other advantages and novel features will become more apparent from the following detailed description of preferred embodiments when taken in conjunction with the accompanying drawings, in which:

DETAILED DESCRIPTION OF THE EMBODIMENTS

Figure 1:
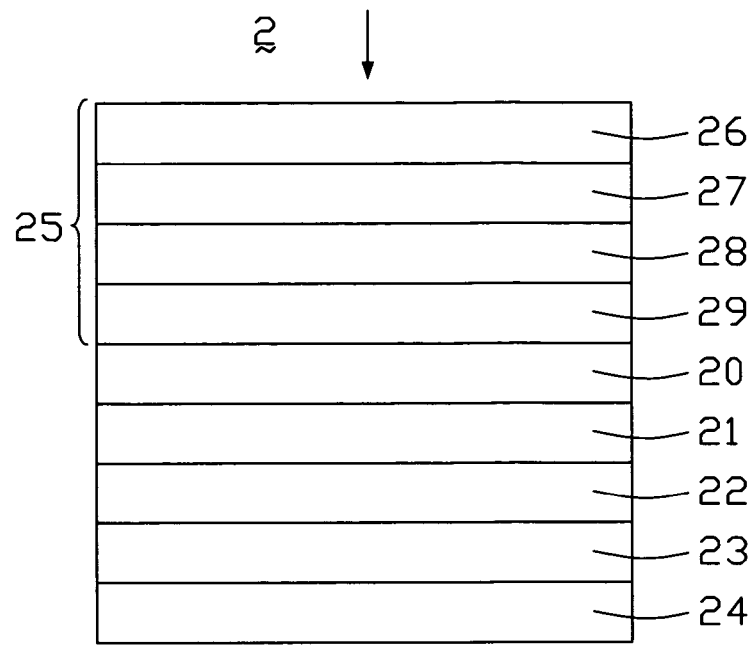
FIG. 1 is a schematic, side view of part of a polarizer in accordance with one preferred embodiment of the present invention.

A polarizer 2 in accordance with a preferred embodiment of the present invention is shown in FIG. 1. The polarizer 2 of an optical system like Liquid Crystal Display (LCD) devices includes an anti-reflection layer 25, a first protective layer 20, a polarizer base 21, a second protective layer 22, an adhesive layer 23 and a released layer release layer 24, arranged in that order from top to bottom.

The first protective layer 20 and the second protective layer 22 protect the polarizer base 21 disposed therebetween. The polarizer base 21 is made from polyvinyl alcohol (PVA), and includes a plurality of polarizer molecules that can change natural light into linear polarized light. The adhesive layer 23 is used to attach the polarizer 2 to a substrate (not shown) of an LCD device. The released layer release layer 24 can protect the adhesive layer 23 up to the time that the polarizer 2 is attached to said substrate. When light irradiates the anti-reflection layer 25 of the polarizer 2, less light is reflected, which improves the light utilization rate of an LCD device.

The anti-reflection layer 25 includes a first layer 26, a second layer 27, a third layer 28 and a fourth layer 29 arranged in that order. The first layer 26 and the third layer 28 are made from material with a low index of refraction, such as $SiO_2$. The second layer 27 and the fourth layer 29 are made from triacetyl cellulose (TAC). A thickness of the first layer 26 is in a range from $7 \times 10^{-8}$ to $9 \times 10^{-8}$ meters. A thickness of the second layer 27 is in a range from $1 \times 10^{-7}$ to $1.2 \times 10^{-7}$ meters. A thickness of the third layer 28 is in a range from $1.5 \times 10^{-8}$ to $3.5 \times 10^{-8}$ meters. A thickness of the fourth layer 29 is in a range from $1 \times 10^{-8}$ to $2 \times 10^{-8}$ meters. The shape anisotropy of the polarizer 2 is in a range from 3:1 to 20:1, and preferably in a range from 5:1 to 10:1.

Because the anti-reflection layer of polarizer can reduce the reflection of the light irradiated on the polarizer, so the loss of light can be reduced and higher light transmission rate can be achieved.

In alternative embodiments, the first layer 26 and the third layer 28 of the anti-reflection layer 25 can be made from material with a high index of refraction, such as $Al_2O_3$ or $SiN_x$. The second layer 27 and the fourth layer 29 of the anti-reflection layer 25 can be made from material with a low index of refraction, such as $NbO_x$, $TiO_3$, $Ti_3O_5$ or $MgF_2$.

Figure 2:
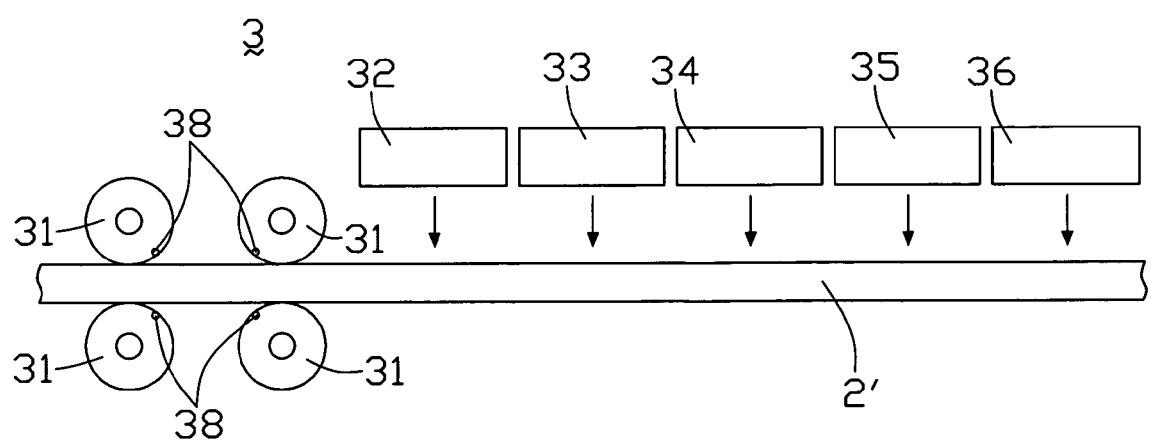
FIG. 2 is a schematic, side view of equipment for manufacturing a polarizer in accordance with another preferred embodiment of the present invention, together with part of a polarizer unitpolarizer preform passing therethrough.
Figure 3:
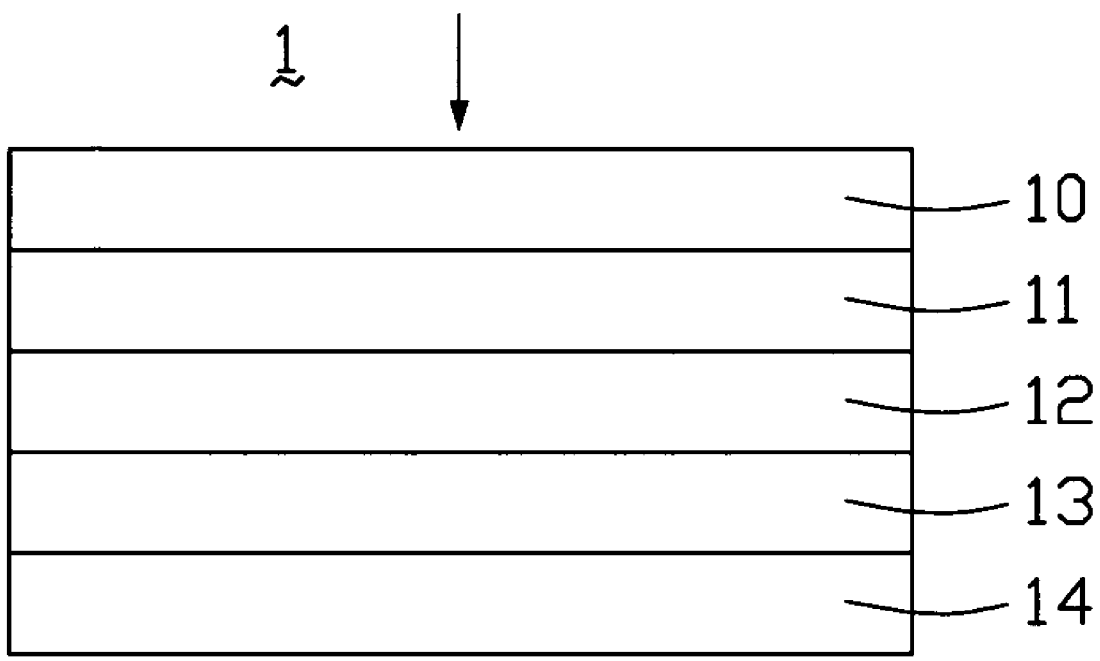
FIG. 3 is a schematic, cross-sectional view of a typical polarizer.

FIG. 2 shows equipment for manufacturing a polarizer according to a preferred embodiment of the present invention. The polarizer manufacturing equipment 3 includes a plurality of roller devices 31 arranged on two sides of a polarizer unitpolarizer preform 2', an ultraviolet irradiation device 32 arranged next in processing sequence to following the roller device 31, and a plurality of vapor deposition devices 33, 34, 35, 36 arranged on one side of the polarizer unitpolarizer preform 2' arranged next in processing sequence to following the ultraviolet irradiation device 32. Each roller device 31 includes a piezoelectric sensor 38 therein for detecting and controlling pressure applied on the polarizer unitpolarizer preform 2' by the roller device 31. The roller devices 31 can cooperatively press the polarizer unitpolarizer preform 2' passing therethrough, in order to create a desired shape anisotropy of the polarizer unitpolarizer preform 2' and orient the polarizer molecules in a preferred longitudinal direction let the polarizer molecules lie down in a preferred orientation. The ultraviolet irradiation device 32 can help to solidify optical polarization of the polarizer unitpolarizer preform 2' by creating shape anisotropy. Thereafter, the vapor deposition devices 33, 34, 35, and 36 can coat deposition materials that have desired different indexes of refraction, in order to form the anti-reflection layer (not shown in FIG. 2) on a surface of the polarizer unitpolarizer preform 2'. The polarizer manufacturing equipment 3 can further include a transducer frequency adjusting device arranged outside the roller devices 31.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A polarizer for a liquid crystal display device, comprising:
    a polarizer base;
    a first protective layer and a second protective layer on two sides of the polarizer base for protecting the polarizer base; and
    an anti-reflection layer on the first protective layer, the anti-reflection layer including a first layer, a second layer, a third layer and a fourth layer stacked in that order, wherein the first and the third layers have a same index of refraction different from another same index of refraction of the second and the fourth layers, a thickness of the first layer is in a range from $7 \times 10^{-8}$ to $9 \times 10^{-8}$ meters, a thickness of the second layer is in a range from $1 \times 10^{-7}$ to $1.2 \times 10^{-7}$ meters, a thickness of the third layer is in a range from $1.5 \times 10^{-8}$ to $3.5 \times 10^{-8}$ meters, and a thickness of the fourth layer is in a range from $1 \times 10^{-8}$ to $2 \times 10^{-8}$ meters.

2. The polarizer as claimed in claim 1, wherein the first layer and the third layer are made from material with a low index of refraction.

3. The polarizer as claimed in claim 2, wherein the first layer and the third layer are made from one of $SiO_2$, $Al_2O_3$, and $SiN_x$.

4. The polarizer as claimed in claim 1, wherein the second layer and the fourth layer are made from material with a high index of refraction.

5. The polarizer as claimed in claim 4, wherein the second layer and the fourth layer are made from one of $Ta_2O_5$, $NbO_x$, $TiO_3$, $Ti_3O_5$, and $MgF_2$.

6. The polarizer as claimed in claim 1, wherein the first protective layer and the second protective layer are made from cellulose triacetate.

7. The polarizer as claimed in claim 1, wherein the polarizer base is made from polyvinyl alcohol.

8. The polarizer as claimed in claim 1, wherein a shape anisotropy of the polarizer is in a range from 3:1 to 20:1.

9. The polarizer as claimed in claim 1, wherein a shape anisotropy of the polarizer is in a range from 5:1 to 10:1.

10. A polarizer for a liquid crystal display device, comprising:
    a polarizer base;
    at least one protective layer formed around said polarizer base for protecting said polarizer base; and
    an anti-reflection layer on said at least one protective layer, the anti-reflection layer including a first layer, a second layer, a third layer and a fourth layer stacked in that order, wherein the first and the third layers have a same index of refraction different from another same index of refraction of the second and the fourth layers, and a shape anisotropy of the polarizer is in a range from 3:1 to 20:1.

* * * * *